3,700,488
SATELLITE

Günter Hoff, Meersburg, and Gerhard Langbein, Oberuhldingen, Germany, assignors to Dornier Systems G.m.b.H., Friedrichshafen, Germany
No Drawing. Continuation-in-part of application Ser. No. 671,229, Sept. 28, 1967. This application July 20, 1970, Ser. No. 56,729
Int. Cl. B44d 1/00
U.S. Cl. 117—94                                5 Claims

ABSTRACT OF THE DISCLOSURE

This invention relates to a satellite having a covering on at least a portion of the exterior thereof of a material having low sound wave resistance, good adsorptive power, and high absorption of energy resulting from the impact of gas molecules upon the satellite at high speed.

---

This application is a continuation-in-part of copending application Ser. No. 671,229, filed Sept. 28, 1967, now abandoned.

Present estimates by experts of the working life of artificial satellites are very inaccurate because it is not yet precisely known what effect the molecules of the high atmosphere exert on a flying object when they collide therewith.

Since density values in the upper atmosphere have been obtained both by means of a mathematical calculation on the basis of the braking or retardation of satellites, and also by mass-spectroscopic measurements, a discrepancy between the values determined becomes apparent in a manner such that the values resulting from retardation measurements are too high by approximately a factor of 2, as compared to the mass-spectroscopic values. An experimental check test to substantiate this difference, and thus an explanation therefor, is not yet available because it has not been possible to produce a molecular ray in the laboratory to experimentally simulate the conditions to which an object is subjected which flies at an altitude of approximately 150 kilometers and at a speed of 75,000 kilometers per hour.

According to a recent report, it has been possible to produce, at the University of Los Angeles, Calif., a molecular ray the kinetic energy of which corresponds approximately to that with which the air particles bombard an artificial satellite. This molecular ray was directed upon metallic and gaseous surfaces and the experiments revealed that the molecules bounced off the hard surfaces in a manner totally different than had been suspected heretofore. When taking into account the behavior of the molecules as they strike upon the satellite, according to the findings, it would appear that an error previously had been made by a factor of 2.

Recently, findings have been made at the University of Bonn, Germany, from which it can be deduced that, at an altitude of approximately 150 kilometers, which figure also was indicated in the publication concerning the work performed at the University of Los Angeles, the values of the particle density for $N_2$, $O_2$, $O_1$, and Ar are lower by about a factor of 2 than the density values which were obtained on the basis of the retardation of satellites.

The problem to be solved consists in finding the cause of the discrepancy between the measured density and between the density values determined mathematically from the retardation of satellites. The starting point used in this connection is the premise that the braking effect is considerably greater, due to the rebound, than was to be expected on the basis of the density indications. Thus, a heretofore unexplained process must take place when the gaseous molecules impinge upon the satellite in orbit, but which process has a merely causative relationship with respect to the surface of the satellite.

More particularly, the present invention provides satellites in which the braking thereof is reduced in the path of rotation and hence the service life thereof is increased. This is achieved in accordance with the present invention due to the fact that at least the end or front face of the satellite has a cohesive coating thereon of a material having a sound wave resistance less than $$4 \cdot 10^5 \frac{\text{g.}}{\text{cm.}^2 \text{ sec.}}$$

an adsorption power of at least 50 monolayers on the surface, and a high energy absorption capacity greater than 90 percent of the impact energy of gas molecules impinging upon the satellite at a velocity in excess of 5000 m./sec. A specular reflection of the gas molecules striking upon the front surface of the satellite is not effected; instead, the molecules penetrate into the hull in an inelastic thrust or impact, and are, in part, adsorbed, i.e., accumulated on the surface, and will, in part, glide off of the surface. The retardation, thus, is only half as great as it is in the case of the fully elastic thrust or impact since the impact energy is converted into heat whereas, in the case of the elastic thrust or impact, it is needed for the reflecting impulse. Since, however, the air density is very low at an altitude of about 150 kilometers, the heating of the satellite surface plays a secondary role and even may be desirable to a certain extent.

Suitable materials for the coating or cover are, particularly, foamed materials. Care should be observed, however, to ensure that the temperature at which the elastic properties are lost, i.e., the so-called freezing temperature, is below the temperature to which the materials are exposed during the orbit in space. This temperature depends upon the orbital altitude of the satellite and, for example, at an altitude of approximately 150 kilometers, it is $+20°$ C., according to present knowledge, and the freezing temperature must, therefore, be lower than $+20°$ C. Polyurethane foam, for example, which has a freezing temperature of $-120°$ C. may be employed as an elastomeric material of this type. Because of the fact that the ambient temperature of a satellite in space is at $+20°$ C. and will not materially decrease because of the low air density, even if the satellite is in the earth's shadow, this material is quite suitable for the intended purpose.

Since the sound wave resistance $$Z = K\sqrt{E \cdot \rho}$$

i.e., since the product is obtained from the density $\rho$ and from the modulus of elasticity $E$, suitable materials may be selected on the basis of both criteria. The density may be very markedly reduced in hard substances, for example metal, by making it in the form of foam, for example electrolytically, or by blowing it in the liquid phase, or it may be sintered from a granulate. As a further example of the coating or covering material, it is possible to use organic compounds, for example polystyrene, in the foamed condition, insofar as the aforementioned conditions are satisfied.

Similarly, also the adsorptive power and the chemisorption, which are both dependent upon the material, may contribute to the realization of the required properties. Desirable in principle is a strong tendency toward chemisorption and also toward physical adsorption because, as a result, the required properties of the coating are further enhanced in that any impinging gas molecules are not reflected from the satellite surface but are adsorbed and the already low sound wave resistance is further reduced thereby.

Using the process of the present invention, it is possible to extend the service or working life of satellites by about a factor of 2. Of course, care should be taken that the covering material has a structure which is not altered or destroyed by the various types of radiation which the satellite encounters in orbit such, for example, as UV-radiation and cosmic radiation.

It will be obvious to those skilled in the art that many modifications may be made within the scope of the present invention without departing from the spirit thereof, and the invention includes all such modifications.

What is claimed is:

1. A satellite having a covering over at least a portion of the exterior thereof of a material having a sound wave resistance less than $$4 \cdot 10^5 \frac{g.}{cm.^2 \; sec.}$$

a good adsorptive power of at least 50 monolayers on the surface, a high energy absorption capacity in excess of 90 percent of the impact energy of gas molecules impinging upon the satellite at a velocity greater than 5000 m./sec., and a freezing temperature lower than the ambient temperature of the satellite in orbit, whereby the elastic properties of the material above said freezing temperature are maintained.

2. A satellite according to claim 1 in which the material is an elastomer.

3. A satellite according to claim 1 in which the material comprises foamed polyurethane.

4. A satellite according to claim 1 in which the material comprises foamed polystyrene.

5. A satellite according to claim 1 in which the material is inert to UV and cosmic radiation.

References Cited

UNITED STATES PATENTS

| | | | |
|---|---|---|---|
| 3,409,247 | 12/1968 | Pezdirtz | 244—1 SS C |
| 3,282,533 | 11/1966 | Spain | 244—1 SS |
| 3,405,886 | 10/1968 | Gosnell et al. | 244—1 SS |

EDWARD G. WHITBY, Primary Examiner

U.S. Cl. X.R.

117—161 KP, 161 UZ; 244—1 SS, 1 SC

UNITED STATES PATENT OFFICE
CERTIFICATE OF CORRECTION

Patent No. 3,700,488                    Dated October 24, 1972

Inventor(s) Günter Hoff et al

It is certified that error appears in the above-identified patent and that said Letters Patent are hereby corrected as shown below:

Column 1, line 4, "Systems" should read - - - System - - -.

Column 1, line 8, the following should be inserted·

- - - Claims priority of German Application No. D 51 622 XI/62d, filed November 24, 1966. - - -

Signed and sealed this 17th day of April 1973.

(SEAL)
Attest:

EDWARD M. FLETCHER, JR.                 ROBERT GOTTSCHALK
Attesting Officer                       Commissioner of Patents